US011704727B2

(12) United States Patent
Farooq et al.

(10) Patent No.: US 11,704,727 B2
(45) Date of Patent: Jul. 18, 2023

(54) METHOD AND APPARATUS FOR REAL-TIME TREASURY APPLICATIONS

(71) Applicant: JPMorgan Chase Bank, N.A., New York, NY (US)

(72) Inventors: Umar Farooq, New York, NY (US); Sairam Rangachari, Scarsdale, NY (US); Jenny Mustazza, Closter, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 441 days.

(21) Appl. No.: 16/934,733

(22) Filed: Jul. 21, 2020

(65) Prior Publication Data

US 2022/0027871 A1  Jan. 27, 2022

(51) Int. Cl.
*G06Q 40/02* (2023.01)
*G06Q 20/10* (2012.01)
*G06Q 40/06* (2012.01)

(52) U.S. Cl.
CPC ........... *G06Q 40/02* (2013.01); *G06Q 20/108* (2013.01); *G06Q 40/06* (2013.01)

(58) Field of Classification Search
CPC ....... G06Q 20/108; G06Q 40/02; G06Q 40/06
See application file for complete search history.

(56) References Cited

U.S. PATENT DOCUMENTS

| 2012/0224057 | A1 | 9/2012 | Gill et al. | |
|---|---|---|---|---|
| 2016/0012465 | A1* | 1/2016 | Sharp | G06Q 20/321 705/14.17 |
| 2017/0330287 | A1* | 11/2017 | Vogel | G06Q 10/0633 |
| 2019/0141006 | A1 | 5/2019 | Schnitt | |

FOREIGN PATENT DOCUMENTS

WO  WO-2012003536 A1 *  1/2012  .......... G06Q 20/102

OTHER PUBLICATIONS

Cheemalapati et al. "Hybrid Cloud Data and API Integration: Integrate Your Enterprise and Cloud with Bluemix Integration Services" Nov. 17, 2015, IBM Redbooks, IBM Redbook Form No. SG24-8277-00 (Year: 2015).*
Houssaini et al. "A Secure and Efficient Login and Data Exchange Scheme for an IoT Laboratory Management System," Jun. 2-16, 2020, 2020 IEEE 6th World Forum on Internet of Things (WF-IoT), doi: 10.1109/WF-IoT48130.2020.9221335., pp. 1-6 (Year: 2020).*
Official Communication Received in International Application No. PCT/US2021/42339, dated Oct. 22, 2021.

* cited by examiner

*Primary Examiner* — Kelly S. Campen
(74) *Attorney, Agent, or Firm* — Greenblum & Bernstein, P.L.C.

(57) ABSTRACT

Various methods, apparatuses/systems, and media for accessing data in real time are provided. A plurality of data sources are provided, each including various data corresponding to a user's account held and managed by an institution. A processor implements API connectivity to connect a user's system of choice to each of the plurality of data sources. A receiver receives user's login data associated with the user's account from the user's system of choice. The processor accesses data corresponding to the user's account in real time from the plurality of data sources via the API connectivity; and causes a GUI of the user's system of choice to display the data in real time.

14 Claims, 8 Drawing Sheets

METHOD AND APPARATUS FOR REAL-TIME TREASURY APPLICATIONS

TECHNICAL FIELD

This disclosure generally relates to data processing, and, more particularly, to methods and apparatuses for implementing a real-time application module for accessing data (i.e., treasury data) in real time.

BACKGROUND

Data management and visualizations may be of importance for clients of an organization. The organization's all clients may have treasury teams that may spend most of the day carrying out their treasury processes in their ERP (Enterprise Resource Planning) systems, for example SAP (Systems Applications and Products). Typical main treasury group is often AP (Accounts Payable) and AR (Accounts Receivables). During the day, these groups may need to sign in to the organization's access portal or call their representative to get information such as current balance on an account or to ensure that a certain flow has happened. At times, they may also need to contact their representative or customer service to inquire about payment status. This typical process may prove to be time consuming and/or inefficient.

SUMMARY

The present disclosure, through one or more of its various aspects, embodiments, and/or specific features or sub-components, may provide, among others, various systems, servers, devices, methods, media, programs, and platforms for implementing a real-time application module for providing applications within the ERP solutions to allow access to data (e.g., treasury data such as bank balance data, bank transactions and payment details data, etc., but the disclosure is not limited thereto) in real time, thereby improving efficiency and automation of an end user's process of obtaining the data in real time because the end user's process does not have to be interrupted by logging into a different system or calling a service desk, but the disclosure is not limited thereto.

The present disclosure, through one or more of its various aspects, embodiments, and/or specific features or sub-components, may also provide, among others, various systems, servers, devices, methods, media, programs, and platforms for implementing a real-time application module for building applications on API (Application Programming Interface) technology thereby allowing a user to access to the same type of data as if the user were logging in to a system of an institution (i.e., a banking institution that holds and manages a account of the user), but the disclosure is not limited thereto. For example, critical data that may be needed to complete daily treasury tasks may be available to the user's core system, thereby improving efficiency and automation of an end user's process of obtaining the critical data in real time.

The present disclosure, through one or more of its various aspects, embodiments, and/or specific features or sub-components, may also provide, among others, various systems, servers, devices, methods, media, programs, and platforms for implementing a real-time application module for building applications that provide visualizations so that the end users can easily grasp current day situation, such as total balances globally or total number of payments sent in real time, but the disclosure is not limited thereto. Furthermore, the interface implemented by the present disclosure may facilitate the ability to obtain detailed information for troubleshooting and investigations. For example, users (e.g., clients) may view their current status onto a single monitor globally and utilize graphs and scorecards to filter information in order to get a distinct set of data. Moreover, according to exemplary embodiments, a client can go from viewing global balances to investigating detailed transactions on a certain account with three clicks within the interface of instant disclosure, but the disclosure is not limited thereto.

According to an aspect of the present disclosure, a method for accessing data by utilizing one or more processors and one or more memories is disclosed. The method may include: providing a plurality of data sources each including various data corresponding to a user's account held and managed by an institution; implementing API (Application Programming Interface) connectivity to connect a user's system of choice to each of the plurality of data sources; receiving user's login data associated with the user's account from the user's system of choice; accessing data corresponding to the user's account in real time from the plurality of data sources via the API connectivity based on verification of the user's login data; and displaying the data in real time onto a graphical user interface (GUI) of the user's system of choice.

According to another aspect of the present disclosure, wherein in implementing API connectivity, the method may further include: building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time.

According to yet another aspect of the present disclosure, the method may further include: accessing the plurality of data sources to report bank account balance data and bank transaction history data associated with the user's account onto the GUI based on verification of the received user's login data; comparing the bank account balance data and the bank transaction history data with the user's corresponding ERP balance data and ERP transaction history data, respectively; and reconciling, based on comparing, any differences between the bank account balance data and the ERP balance data and between the bank transaction history data and the ERP transaction history data.

According to further aspect of the present disclosure, wherein the data corresponds to treasury data, but the disclosure is not limited thereto.

According to an additional aspect of the present disclosure, wherein the institution is a banking institution, but the disclosure is not limited thereto.

According to another aspect of the present disclosure, the data may correspond to one or more of the following data: balance data, transaction data, payment details data, access status data, and audit report data, but the disclosure is not limited thereto.

According to yet another aspect of the present disclosure, the method may further include: displaying current global status information data of the user onto the GUI; and filtering information to obtain a distinct set of data as desired by the user by utilizing graphs and scorecards.

According to an additional aspect of the present disclosure, a system for accessing data is disclosed. The system may include a plurality of data sources each including various data corresponding to a user's account held and managed by an institution; and a processor operatively connected to the plurality of data sources via a communication network. The processor may be configured to: implement API (Application Programming Interface) connectivity to connect a user's system of choice to each of the plurality of data sources; receive user's login data associated with the user's account from the user's system of choice; access data corresponding to the user's account in real time from the plurality of data sources via the API connectivity; and cause a graphical user interface (GUI) of the user's system of choice to display the data in real time.

According to another aspect of the present disclosure, wherein in implementing API connectivity, the processor may be further configured to: build applications on API technology such that the user can access the same type of data as if the user were logging in to a system managed and operated by the institution; run the applications within an ERP (Enterprise Resource Planning) solution system of the user's system of choice; and implement the API connectivity to access data from the plurality of data sources in real time.

According to yet another aspect of the present disclosure, the processor may be further configured to: access the plurality of databases to report bank account balance data and bank transaction history data associated with the user's bank account onto the GUI based on the received user's login data; compare the bank account balance data and the bank transaction history data with the user's corresponding ERP balance data and ERP transaction history data, respectively; and reconcile, based on comparing, any differences between the bank account balance data and the ERP balance data and between the bank transaction history data and the ERP transaction history data.

According to a further aspect of present disclosure, the processor may be further configured to: cause the GUI to display current global status information data of the user; and filter information to obtain a distinct set of data as desired by the user based on graphs and scorecards.

According to an additional aspect of the present disclosure, a non-transitory computer readable medium configured to store instructions for accessing data is disclosed. The instructions, when executed, may cause a processor to perform the following: configuring a plurality of data sources each including various data corresponding to a user's account held and managed by an institution; implementing API (Application Programming Interface) connectivity to connect a user's system of choice to each of the plurality of data sources; receiving user's login data associated with the user's account from the user's system of choice; accessing data corresponding to the user's account in real time from the plurality of data sources via the API connectivity based on verification of the user's login data; and displaying the data in real time onto a graphical user interface (GUI) of the user's system of choice.

According to a further aspect of the present disclosure, wherein in implementing API connectivity, the instructions, when executed, may further cause the processor to perform the following: building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time.

According to yet another aspect of the present disclosure, wherein the instructions, when executed, may further cause the processor to perform the following: accessing the plurality of data sources to report bank account balance data and bank transaction history data associated with the user's account onto the GUI based on verification of the received user's login data; comparing the bank account balance data and the bank transaction history data with the user's corresponding ERP balance data and ERP transaction history data, respectively; and reconciling, based on comparing, any differences between the bank account balance data and the ERP balance data and between the bank transaction history data and the ERP transaction history data.

According to another aspect of the present disclosure, wherein the instructions, when executed, may further cause the processor to perform the following: causing the GUI to display current global status information data of the user; and filtering information to obtain a distinct set of data as desired by the user by utilizing graphs and scorecards.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

Figure 1:
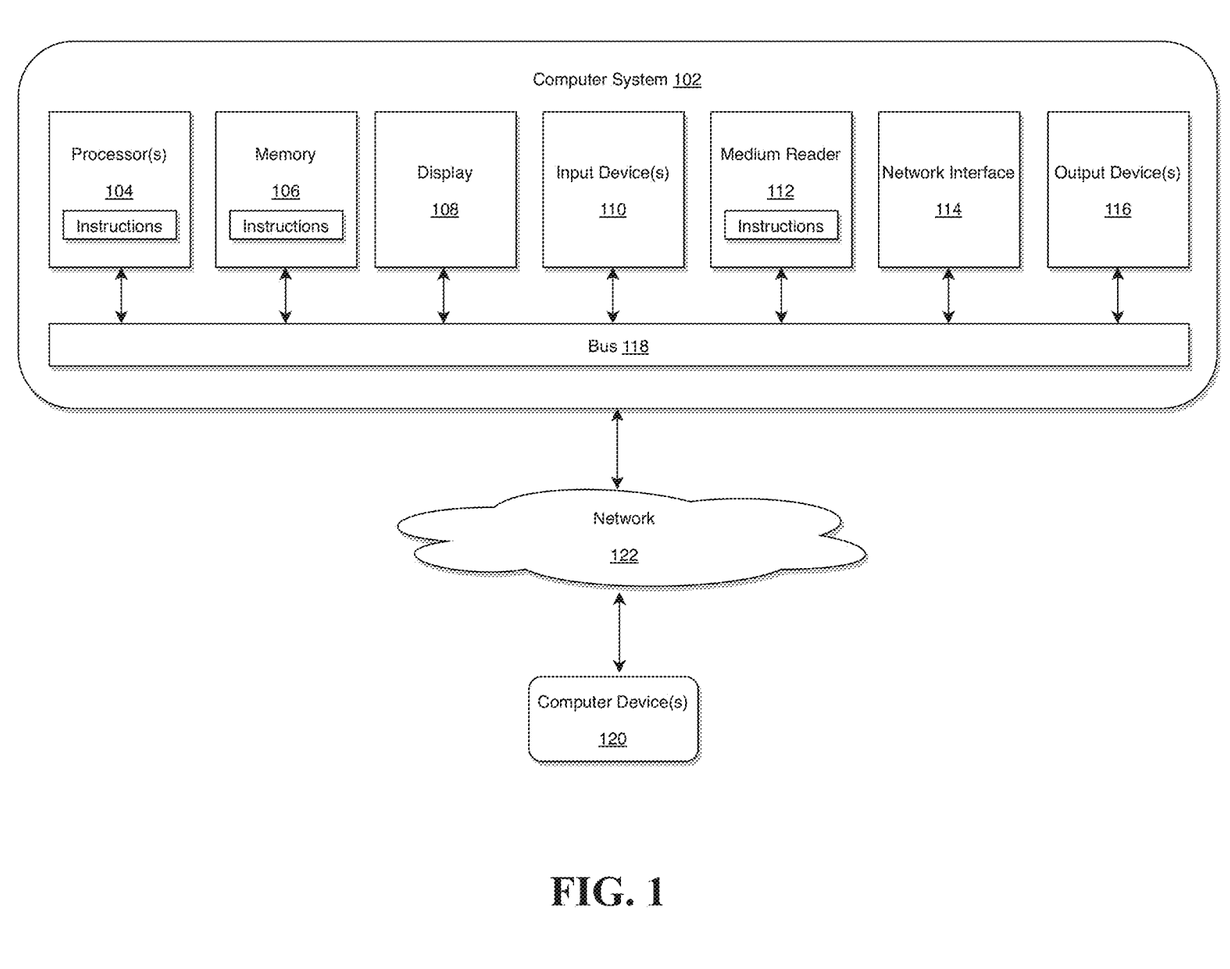
FIG. 1 illustrates a computer system for implementing a real-time application device in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (OPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes of implementing a real-time application module for providing applications within the ERP solutions to allow access to data (e.g., treasury data such as bank balance data, bank transactions and payment details data, etc., but the disclosure is not limited thereto) in real time, thereby improving efficiency and automation of an end user's process of obtaining the data in real time because the end user's process does not have to be interrupted by logging into a different system or calling a service desk, but the disclosure is not limited thereto.

Figure 2:
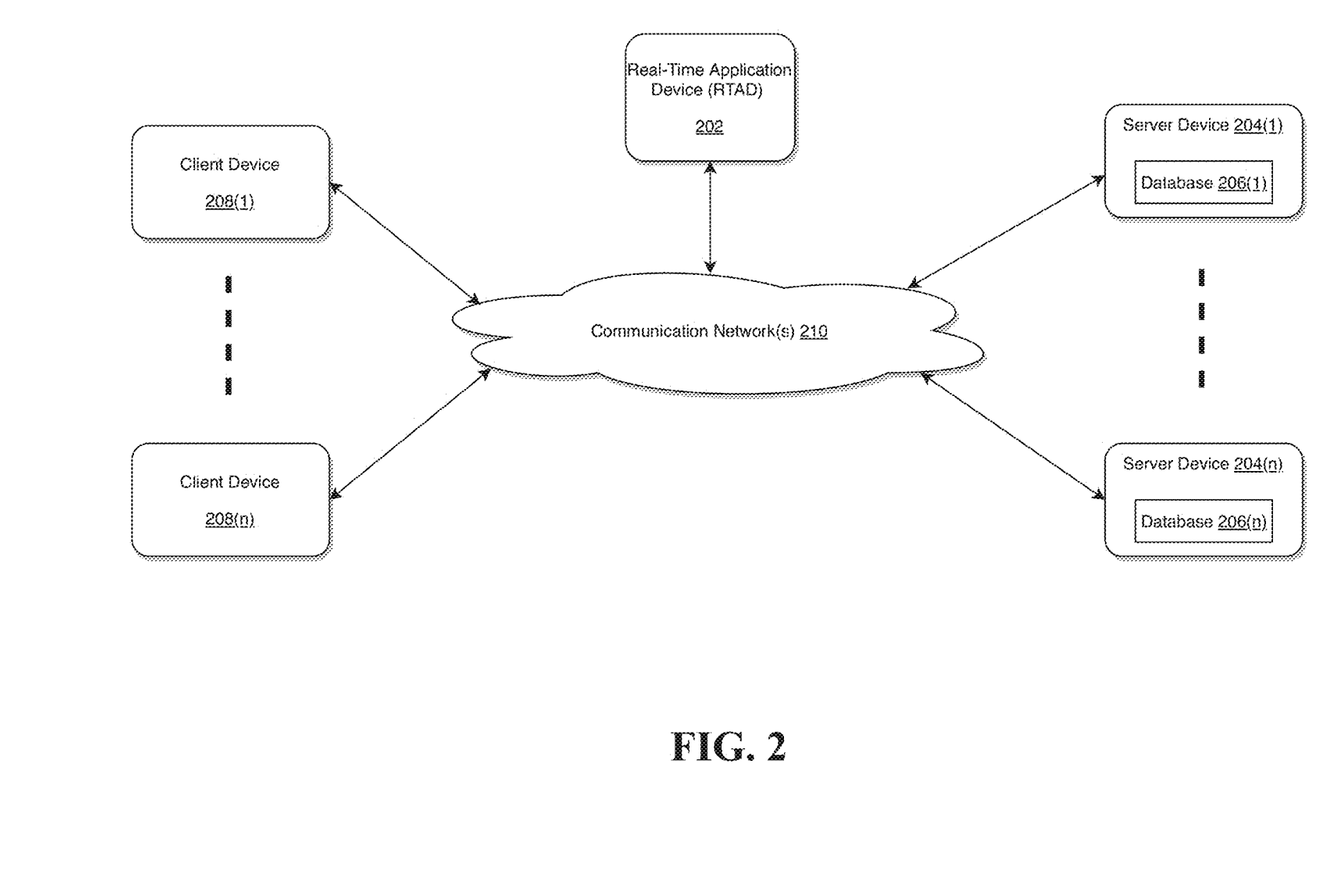
FIG. 2 illustrates an exemplary diagram of a network environment with a real-time application device in accordance with an exemplary embodiment.

Referring to FIG. 2, a schematic of an exemplary network environment 200 for implementing a real-time application device (RTAD) of the instant disclosure is illustrated.

According to exemplary embodiments, the above-described problems associated with conventional system may be overcome by implementing an RTAD 202 having a real-time application module as illustrated in FIG. 2 that may provide applications within the ERP solutions to allow access to data (e.g., treasury data such as bank balance data, bank transactions and payment details data, etc., but the disclosure is not limited thereto) in real time, thereby improving efficiency and automation of an end user's process of obtaining the data in real time, but the disclosure is not limited thereto. According to exemplary embodiments, the above-described problems associated with conventional system may be overcome by implementing an RTAD 202 having a real-time application module as illustrated in FIG. 2 for building applications on API (Application Programming Interface) technology thereby allowing a user to access to the same type of data as if the user were logging in to a system of an institution (i.e., a banking institution that holds and manages a account of the user), but the disclosure is not limited thereto. For example, critical data that may be needed to complete daily treasury tasks may be become available in real time to the user's core system by utilizing the RTAD 202, thereby improving efficiency and automation of an end user's process of obtaining the critical data in real time, but the disclosure is not limited thereto.

The RTAD 202 may be the same or similar to the computer system 102 as described with respect to FIG. 1.

The RTAD 202 may store one or more applications that can include executable instructions that, when executed by the RTAD 202, cause the RTAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTAD 202 itself, may be located in virtual server(s) running in a cloud-based computing environment rather than being tied to one or more specific physical network computing devices. Also, the application(s) may be running in one or more virtual machines (VMs) executing on the RTAD 202. Additionally, in one or more embodiments of this technology, virtual machine(s) running on the RTAD 202 may be managed or supervised by a hypervisor.

In the network environment 200 of FIG. 2, the RTAD 202 is coupled to a plurality of server devices 204(1)-204(n) that hosts a plurality of databases 206(1)-206(n), and also to a plurality of client devices 208(1)-208(n) via communication network(s) 210. A communication interface of the RTAD 202, such as the network interface 114 of the computer system 102 of FIG. 1, operatively couples and communicates between the RTAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like). Public Switched Telephone Network (PSTNs), Ethernet-based Packet Data Networks (PDNs), combinations thereof, and the like.

The RTAD 202 may be a standalone device or integrated with one or more other devices or apparatuses, such as one or more of the server devices 204(1)-204(n), for example. In one particular example, the RTAD 202 may be hosted by one of the server devices 204(1)-204(n), and other arrangements are also possible. Moreover, one or more of the devices of the RTAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RTAD 202 that may be configured for building applications on API (Application Programming Interface) technology thereby allowing a user to access to the same type of data as if the user were logging in to a system of an institution (i.e., a banking institution that holds and manages a account of the user), but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the RTAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RTAD 202, the server devices 204(1)-204(n), the client devices 208(l)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTAD 202, the server devices 204(1)-204(n), or the client devices 208(1)-208(n), for example, may be configured to operate as virtual instances on the same physical machine. For example, one or more of the RTAD 202, the server devices 204(1)-204(n), or the client devices 208(1)-208(n) may operate on the same physical device rather than as separate devices communicating through communication network(s) 210. Additionally, there may be more or fewer RTADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
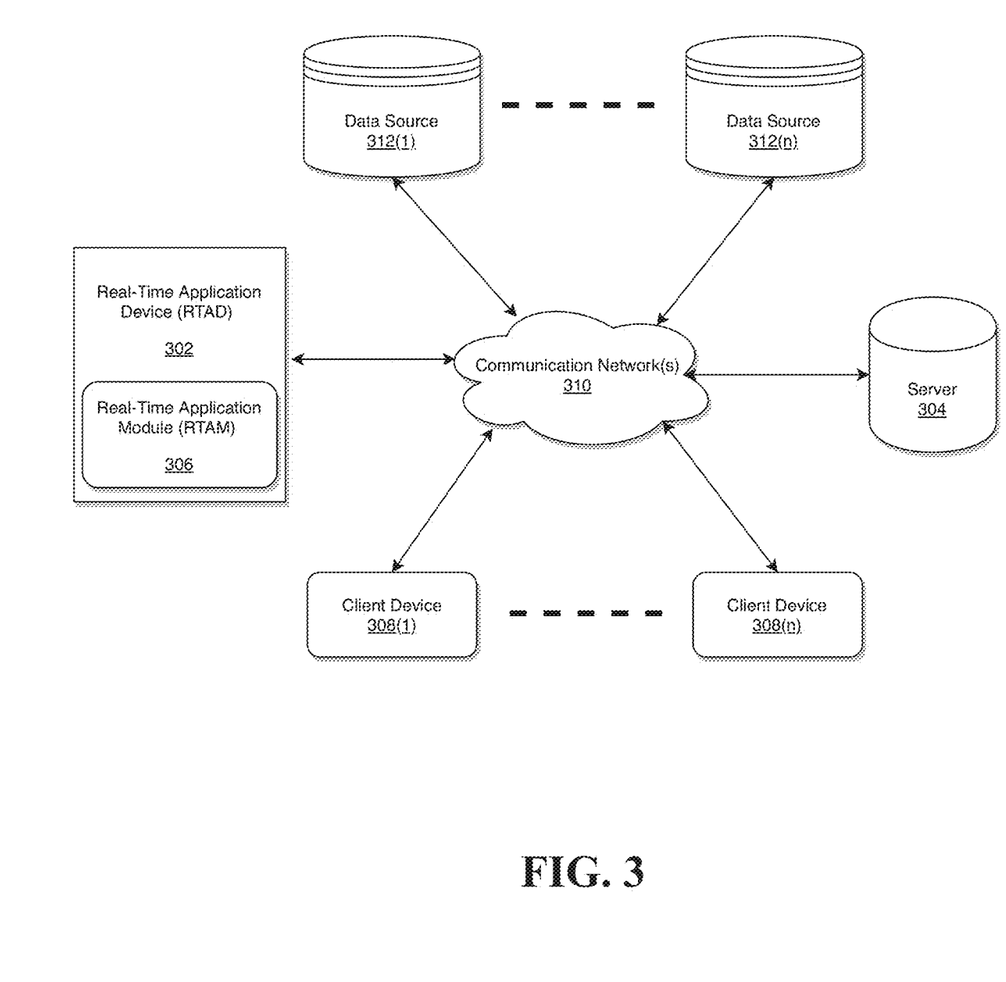
FIG. 3 illustrates a system diagram for implementing a real-time application device with a real-time application module in accordance with an exemplary embodiment.

FIG. 3 illustrates a system diagram for implementing a real-time application device (RTAD) with a real-time application module (RTAM) in accordance with an exemplary embodiment.

As illustrated in FIG. 3, the RTAD 302 including the RTAM 306 may be connected to a server 304, and a plurality of data sources 312(1)-312(n) via a communication network 310. The RTAD 302 may also be connected to a plurality of client devices 308(1)-308(n) via the communication network 310, but the disclosure is not limited thereto.

According to exemplary embodiment, the RTAD 302 is described and shown in FIG. 3 as including the RTAM 306, although it may include other rules, policies, modules, databases, or applications, for example. According to exemplary embodiments, the plurality of data sources 312(1)-312 (n) may be embedded within the RTAD 302. According to exemplary embodiments, the plurality of data sources 312 (1)-312(n) may be configured to store various data corresponding to a user's (e.g., a client) account held and managed by an institution (e.g., a bank or other financial institution), but the disclosure is not limited thereto.

According to exemplary embodiments, the RTAM 306 may be configured to receive continuous feed of data from the plurality of data sources 312(1)-312(n) in real-time when the RTAM 306 is implemented via API connectivity. One skilled in the art would readily understand that real-time data may refer to data that is presented to the client as it is acquired by the institution.

As will be described below, the RTAM 306 may be configured to implement API connectivity to connect a user's system of choice embedded within a client device (one or more of the client devices 308(1)-308(n)) to each of the plurality of data sources 312(1)-312(n); receive user's login data associated with the user's account from the user's system of choice; access data corresponding to the user's account in real time from the plurality of data sources 312(1)-312(n) via the API connectivity based on verification of the user's login data; and display the data in real time onto a graphical user interface (GUI) of the user's system of choice, but the disclosure is not limited thereto.

The plurality of client devices 308(1)-308(n) are illustrated as being in communication with the RTAD 302. In this regard, the plurality of client devices 308(1)-308(n) may be "clients" of the RTAD 302 and are described herein as such. Nevertheless, it is to be known and understood that the plurality of client devices 308(1)-308(n) need not necessarily be "clients" of the RTAD 302, or any entity described in association therewith herein. Any additional or alternative relationship may exist between either or more of the plurality of client devices 308(1)-308(n) and the RTAD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the RTAD 302 via broadband or cellular communication. Of course, these embodiments are merely exemplary and are not limiting or exhaustive.

Figure 4:
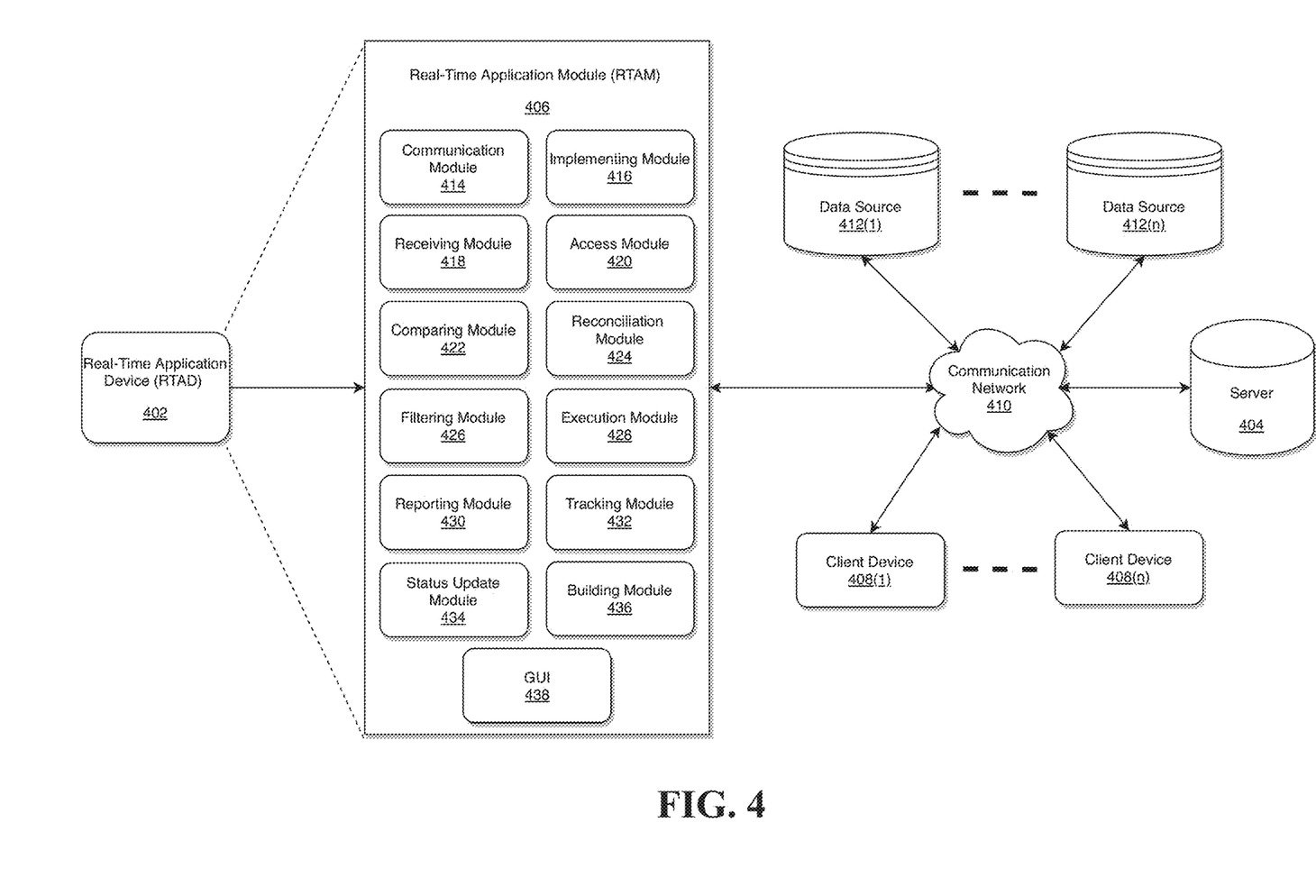
FIG. 4 illustrates a system diagram for implementing a real-time application module of FIG. 3 in accordance with an exemplary embodiment.

FIG. 4 illustrates a system diagram for implementing a real-time application module of FIG. 3 in accordance with an exemplary embodiment. As illustrated in FIG. 4, the system 400 may include a real-time application device (RTAD) 402 within which a real-time application module (RTAM) 406 may be embedded, plurality of data sources 412(1)-412(n), a server 404, client devices 408(l)-408(n), and a communication network 410. According to exemplary embodiments, the RTAD 402, RTAM 406, plurality of data sources 412(1)-412(n), the server 404, the client devices 408(1)-408(n), and the communication network 410 as illustrated in FIG. 4 may be the same or similar to the RTAD 302, RTAM 306, data sources 312(1)-312(n), the server 304, the client devices 308(1)-308(n), and the communication network 310, respectively, as illustrated in FIG. 3.

As illustrated in FIG. 4, the RTAM 406 may include a communication module 414, an implementing module 416, a receiving module 418, an access module 420, a comparing module 422, a reconciliation module 424, a filtering module 426, an execution module 428, a reporting module 430, a tracking module 432, a status update module 434, a building module 436, and a GUI 438. According to exemplary embodiments, the plurality of data sources 412(1)-412(n) may be external to the RTAD 402 may include various systems that are managed and operated by an organization or institution. Alternatively, according to exemplary embodiments, the plurality of data sources 412(1)-412(n) may be embedded within the RTAD 402 and/or the RTAM 406

The process may be executed via the communication network 410, which may comprise plural networks as described above. For example, in an exemplary embodiment, the various components of the RTAM 406 may communicate with the server 404, and the plurality of data sources 412(1)-412(n) via the communication network 410 and the communication module 414. Of course, these embodiments are merely exemplary and are not limiting or exhaustive.

According to exemplary embodiments, the communication network 410 may be configured to establish a link between the plurality of data sources 412(1)-412(n), the client devices 408(1)-408(n) and the RTAM 406.

According to exemplary embodiments, each of the communication module 414, implementing module 416, receiving module 418, access module 420, comparing module 422, reconciliation module 424, filtering module 426, execution module 428, reporting module 430, tracking module 432, status update module 434, and the building module 436 may be implemented by microprocessors or similar, they may be programmed using software (e.g., microcode) to perform various functions discussed herein and may optionally be driven by firmware and/or software. Alternatively, each of the communication module 414, implementing module 416, receiving module 418, access module 420, comparing module 422, reconciliation module 424, filtering module 426, execution module 428, reporting module 430, tracking module 432, status update module 434, and the building module 436 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, implementing module 416, receiving module 418, access module 420, comparing module 422, reconciliation module 424, filtering module 426, execution module 428, reporting module 430, tracking module 432, status update module 434, and the building module 436 may be physically separated into two or more interacting and discrete blocks, units, devices, and/or modules without departing from the scope of the inventive concepts.

According to exemplary embodiments, each of the plurality of data sources 412(1)-412(n) may include various data corresponding to a user's account held and managed by an institution. The institution may be a bank or financial institution, but the disclosure is not limited thereto. According to exemplary embodiments, the data may correspond to treasury data, but the disclosure is not limited thereto. According to exemplary embodiments, the data may also correspond to one or more of the following data: bank balance data, bank transaction data, payment details data, user access status data, and audit report data, etc., but the disclosure is not limited thereto. For example, the data may include any data corresponding to the user's account.

According to exemplary embodiments, the implementing module 416 may be configured to implement API connectivity to connect a user's system of choice (e.g., a system embedded within one or more of the client devices 408(1)-408(n)) to each of the plurality of data sources 412(1)-412(n).

According to exemplary embodiments, the receiving module 418 may be configured to receive user's login data associated with the user's account from the user's system of choice (e.g., a system embedded within one or more of the client devices 408(1)-408(n)).

According to exemplary embodiments, the access module 420 may be configured to access data corresponding to the user's account in real time from the plurality of data sources 412(1)-412(n) via the API connectivity based on verification of the user's login data.

According to exemplary embodiments, the data may be displayed in real time onto the GUI 438 of the user's system of choice (e.g., a system embedded within one or more of the client devices 408(1)-408(n)).

According to exemplary embodiments, in implementing API connectivity, the building module 436 may be configured to build applications on API technology such that the user can access the same type of data as if the user were logging in to a system managed and operated by the institution. According to exemplary embodiments, the execution module 428 may be configured to run the applications within an ERP (Enterprise Resource Planning) solution system of the user's system of choice. The ERP solution system may be an SAP. According to exemplary embodiments, the implementing module 416 may be configured to implement the API connectivity to access data from the plurality of data sources 412(1)-412(n) in real time.

According to exemplary embodiments, the access module 420 may be configured to access the plurality of data sources 412(1)-412(n) to report bank account balance data and bank transaction history data associated with the user's account onto the GUI 438 based on verification of the received user's login data. The comparing module 422 may be configured to compare the bank account balance data and the bank transaction history data with the user's corresponding ERP balance data and ERP transaction history data, respectively. The reconciliation module 424 may be configured to reconcile, based on comparing by the comparing module 422, any differences between the bank account balance data and the ERP balance data and between the bank transaction history data and the ERP transaction history data.

According to exemplary embodiments, the reporting module 430 may be configured to report real-time account balances, real-time transaction visibility, and bank versus ERP balance reconciliation onto a single, central monitor of the user's core system, but the disclosure is not limited thereto.

Figure 5A:
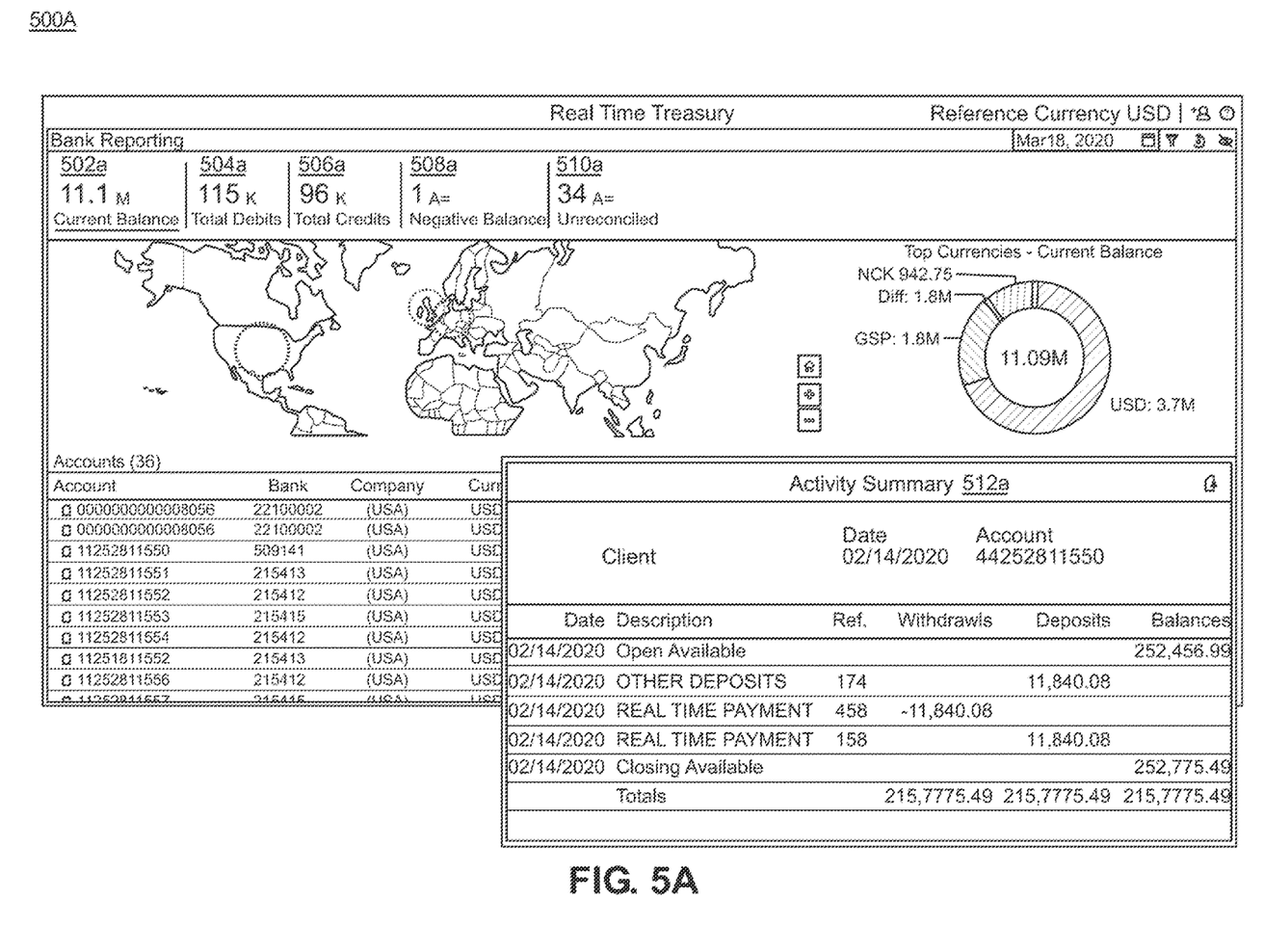
FIG. 5A illustrates an exemplary use case of the real-time application module in accordance with an exemplary embodiment.

An exemplary reporting use case by utilizing the reporting module 430 is illustrated in FIG. 5A. As illustrated in FIG. 5A, the monitor 500A within the client device (one of 408(1)-408(n)) may display bank reporting data in real time from the institution's reporting as accessed from the data sources 412(1)-412(n). For example, current balance data 502a, total debits 504a, total credits 506a, negative balance data 508a, and unreconciled data 510a, associated with the user's account who is requesting data via API connectivity by utilizing the RTAM 406, are displayed on the monitor 500A in real time. Of course, there are exemplary data. Any other data or combination of data associated with the users' account may be displayed on the monitor 500A as desired by the user (i.e., a client of the institution). An activity summary 512a has also been displayed on the monitor 500A, but the disclosure is not limited thereto.

According to exemplary embodiments, the tracking module 432 may be configured to track payment history data and swift GPI enabled payment journey data, and display those data onto a single, central monitor, but the disclosure is not limited thereto.

Figure 5B:
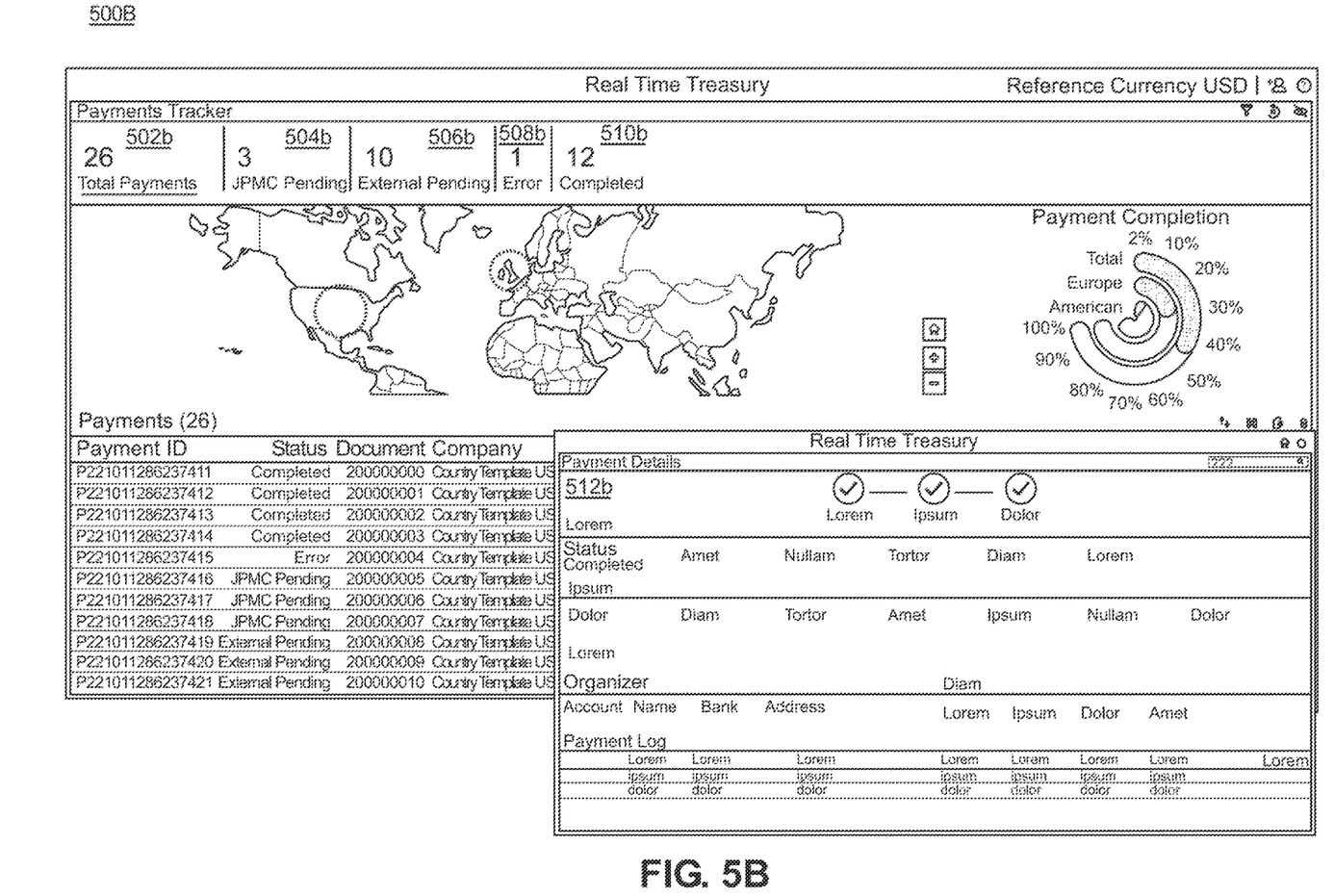
FIG. 5B illustrates another exemplary use case of the real-time application module in accordance with an exemplary embodiment.

An exemplary tracking use case by utilizing the tracking module 432 is illustrated in Fla 5B. As illustrated in FIG. 5B, the monitor 500B within the client device (one of 408(1)-408(n)) may display payment status alerts, payment history data and swift GPI enabled payment journey data in real time from the institution's reporting as accessed from the data sources 412(1)-412(n). For example, total payments data 502b, pending data 504b, external pending data 506b, error data 508b, and completed data 510, associated with the user's account who is requesting data via API connectivity by utilizing the RTAM 406, are displayed on the monitor 500B in real time. Of course, there are exemplary data. Any other data or combination of data associated with the users' account may be displayed on the monitor 500B as desired by the user (i.e., a client of the institution). A payment tracker summary 512b has also been displayed on the monitor 500B, but the disclosure is not limited thereto.

According to exemplary embodiments, the status update module 434 may be configured to update status of the users, and display those status update data onto a single, central monitor, but the disclosure is not limited thereto.

Figure 5C:
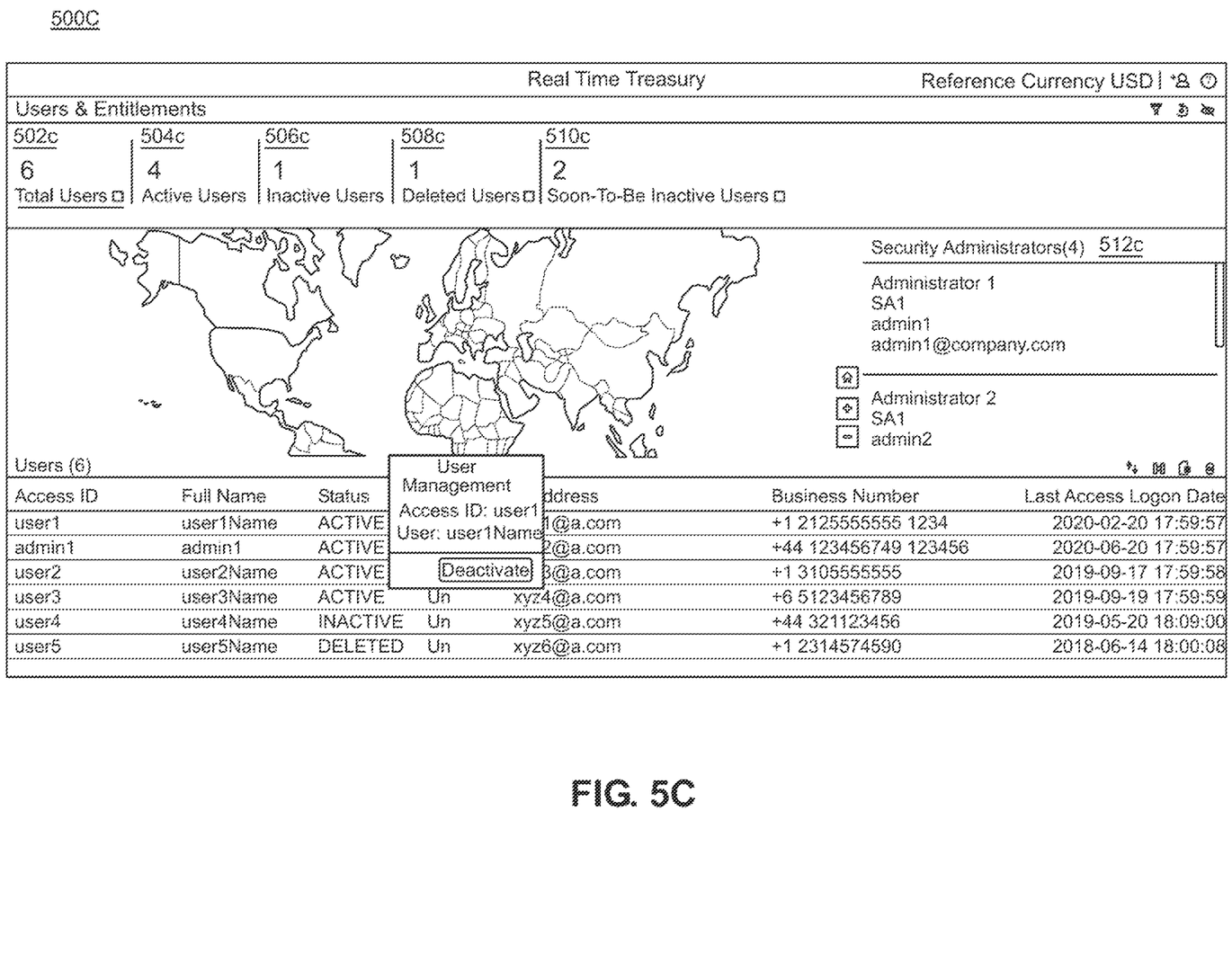
FIG. 5C illustrates yet another exemplary use case of the real-time application module in accordance with an exemplary embodiment.

An exemplary users' status use case by utilizing the status update module 434 is illustrated in FIG. 5C. As illustrated in FIG. 5C, the monitor 500C within the client device (one of 408(1)-408(n)) may display total users data 502c, active users data 504c, inactive users data 506c, deleted users data 508c, and soon-to-be inactive users data 510c in real time from the institution's reporting as accessed from the data sources 412(1)-412(n). Of course, there are exemplary data. Any other data or combination of data associated with the users' account may be displayed on the monitor 500C as desired by the user. A security administrator(s) list 512c has also been displayed on the monitor 500C, but the disclosure is not limited thereto.

According to exemplary embodiments, the GUI 438 may display current global status information data of the user and the filtering module 426 may be configured to filter information to obtain a distinct set of data as desired by the user by utilizing graphs and scorecards. The GUI 438 may be embedded within the client devices 408(1)-408(n).

According to exemplary embodiments, the applications created by the RTAM 406 within SAP may allow clients to access their treasure data in real time. As disclosed herein, the applications are configured to allow bank reporting and SAP reconciliation in real time, payment tracking from initiation to receipt by final beneficiary and visibility of user status and entitlements. The implementation process, according to exemplary embodiments, may require only minimal resources. SSL (Secure Sockets Layer) certificates and common authentication and authorization processes may be required for establishing secure communication. According to exemplary embodiments, user entitlements may be authorized through existing SAP admin center. According to exemplary embodiments, these applications may be certified by SAP and may be available for ECC 6.0+ and S4/HANA.

According to exemplary embodiments, a non-transitory computer readable medium may be configured to store instructions for accessing data in real time. According to exemplary embodiments, the instructions, when executed, may cause a processor embedded within the RTAM 406 or the RTAD 402 to perform the following: configuring a plurality of data sources each including various data corresponding to a user's account held and managed by an institution; implementing API (Application Programming Interface) connectivity to connect a user's system of choice to each of the plurality of data sources; receiving user's login data associated with the user's account from the user's system of choice; accessing data corresponding to the user's account in real time from the plurality of data sources via the API connectivity based on verification of the user's login data; and displaying the data in real time onto a graphical user interface (GUI) of the user's system of choice. The processor may be the same or similar to the processor 104 as illustrated in FIG. 1 or the processor embedded within RTAD 202, RTAD 302, RTAM 306. RTAD 402, and RTAM 406.

According to exemplary embodiments, in implementing API connectivity, the instructions, when executed, may further cause the processor to perform the following: building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time.the instructions, when executed, may further cause the processor 104 to perform the following: implementing code data transformation services as part of the data processing framework.

According to exemplary embodiments, the instructions, when executed, may further cause the processor 104 to perform the following: accessing the plurality of data sources to report bank account balance data and bank transaction history data associated with the user's account onto the GUI based on verification of the received user's login data; comparing the bank account balance data and the bank transaction history data with the user's corresponding ERP balance data and ERP transaction history data, respectively; and reconciling, based on comparing, any differences between the bank account balance data and the ERP balance data and between the bank transaction history data and the ERP transaction history data.

According to exemplary embodiments, the instructions, when executed, may further cause the processor 104 to perform the following: causing the GUI to display current global status information data of the user; and filtering information to obtain a distinct set of data as desired by the user by utilizing graphs and scorecards.

Figure 6:
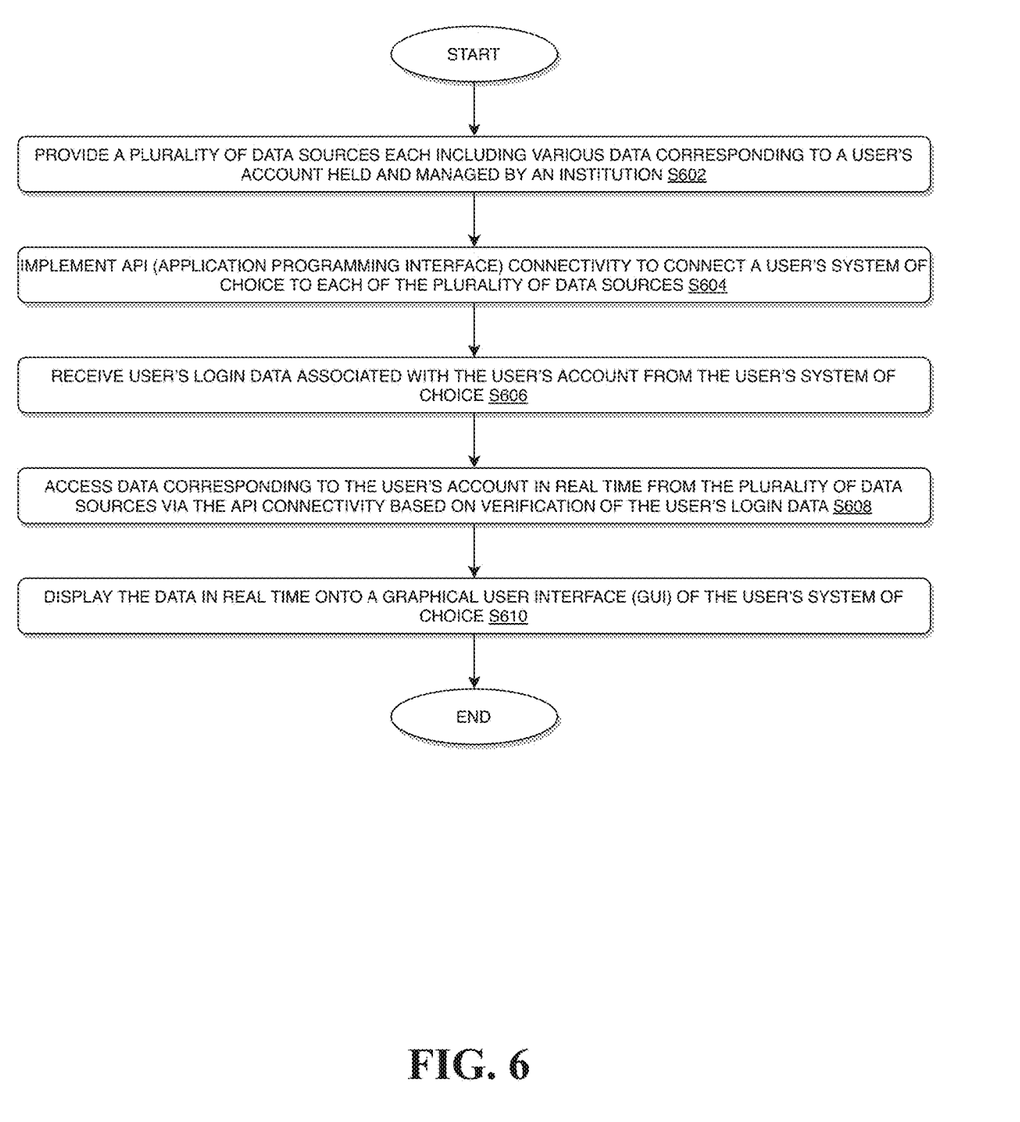
FIG. 6 illustrates a flow chart for implementing a real-time application module in accordance with an exemplary embodiment.

FIG. 6 illustrates a flow chart for implementing a real-time application module for accessing data in real time by utilizing one or more processors and one or more memories in accordance with an exemplary embodiment.

In the process 600 of FIG. 6, at step S602, a plurality of data sources may be provided. Each data source may include various data corresponding to a user's account held and managed by an institution. At step S604, API connectivity may be implemented to connect a user's system of choice to each of the plurality of data sources. At step S606, user's login data associated with the user's account may be received from the user's system of choice. At step S608, data corresponding to the user's account may be accessed in real time from the plurality of data sources via the API connectivity based on verification of the user's login data. At step S610, the data may be displayed in real time onto a graphical user interface (GUI) of the user's system of choice.

According to exemplary embodiments, in implementing API connectivity, the process 600 may further include: building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time.

According to exemplary embodiments, the process 600 may further include: accessing the plurality of data sources to report bank account balance data and bank transaction history data associated with the user's account onto the GUI based on verification of the received user's login data; comparing the bank account balance data and the bank transaction history data with the user's corresponding ERP balance data and ERP transaction history data, respectively; and reconciling, based on comparing, any differences between the bank account balance data and the ERP balance data and between the bank transaction history data and the ERP transaction history data.

According to exemplary embodiments, the process 600 may further include: displaying current global status information data of the user onto the GUI; and filtering information to obtain a distinct set of data as desired by the user by utilizing graphs and scorecards.

According to exemplary embodiments as disclosed above in FIGS. 1-6, technical improvements effected by the instant disclosure may include platforms for implementing a real-time application module for providing applications within the ERP solutions to allow access to data (e.g., treasury data such as bank balance data, bank transactions and payment details data, etc., but the disclosure is not limited thereto) in real time, thereby improving efficiency and automation of an end user's process of obtaining the data in real time because the end user's process does not have to be interrupted by logging into a different system or calling a service desk, but the disclosure is not limited thereto.

According to exemplary embodiments as disclosed above in FIGS. 1-6, technical improvements effected by the instant disclosure may also include platforms for implementing a real-time application module for building applications on API (Application Programming Interface) technology thereby allowing a user to access to the same type of data as if the user were logging in to a system of an institution (i.e., a banking institution that holds and manages a account of the user), but the disclosure is not limited thereto. For example, critical data that may be needed to complete daily treasury tasks may be available to the user's core system, thereby improving efficiency and automation of an end user's process of obtaining the critical data in real time.

According to exemplary embodiments as disclosed above in FIGS. 1-6, technical improvements effected by the instant disclosure may also include platforms for implementing a real-time application module for building applications that provide visualizations so that the end users can easily grasp current day situation, such as total balances globally or total number of payments sent in real time, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for accessing data by utilizing one or more processors and one or more memories, the method comprising:
   providing a plurality of data sources each including various data corresponding to a user's account held and managed by an institution;
   implementing API (Application Programming Interface) connectivity to connect a user's system of choice to each of the plurality of data sources by building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time;
   receiving user's login data associated with the user's account from the user's system of choice;
   accessing data corresponding to the user's account in real time from the plurality of data sources via the API connectivity based on verification of the user's login data;
   displaying the data in real time onto a graphical user interface (GUI) of the user's system of choice;
   accessing the plurality of data sources to report bank account balance data and bank transaction history data associated with the user's account onto the GUI based on verification of the received user's login data;
   comparing the bank account balance data and the bank transaction history data with the user's corresponding ERP balance data and ERP transaction history data, respectively; and
   reconciling, based on comparing, any differences between the bank account balance data and the ERP balance data and between the bank transaction history data and the ERP transaction history data.

2. The method according to claim 1, wherein the data corresponds to treasury data.

3. The method according to claim 1, wherein the institution is a banking institution.

4. The method according to claim 1, wherein the data corresponds to data that includes one or more of the following data: balance data, transaction data, payment details data, access status data, and audit report data.

5. The method according to claim 1, further comprising:
   displaying current global status information data of the user onto the GUI; and
   filtering information to obtain a distinct set of data as desired by the user by utilizing graphs and scorecards.

6. A system for accessing data, comprising:
   a plurality of data sources each including various data corresponding to a user's account held and managed by an institution; and
   a processor operatively connected to the plurality of data sources via a communication network,
   wherein the processor is configured to:
      implement API (Application Programming Interface) connectivity to connect a user's system of choice to each of the plurality of data sources by building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time;
      receive user's login data associated with the user's account from the user's system of choice;
      access data corresponding to the user's account in real time from the plurality of data sources via the API connectivity;
      cause a graphical user interface (GUI) of the user's system of choice to display the data in real time;
      access the plurality of databases to report bank account balance data and bank transaction history data associated with the user's bank account onto the GUI based on the received user's login data;
      compare the bank account balance data and the bank transaction history data with the user's corresponding ERP balance data and ERP transaction history data, respectively; and
      reconcile, based on comparing, any differences between the bank account balance data and the ERP balance data and between the bank transaction history data and the ERP transaction history data.

7. The system according to claim 6, wherein the data corresponds to treasury data.

8. The system according to claim 6, wherein the institution is a banking institution.

9. The system according to claim 6, wherein the data corresponds to data that includes one or more of the following data: balance data, transaction data, payment details data, access status data, and audit report data.

10. The system according to claim 6, wherein the processor is further configured to:
    cause the GUI to display current global status information data of the user; and
    filter information to obtain a distinct set of data as desired by the user based on graphs and scorecards.

11. A non-transitory computer readable medium configured to store instructions for accessing data, wherein when executed, the instructions cause a processor to perform the following:

configuring a plurality of data sources each including various data corresponding to a user's account held and managed by an institution;
implementing API (Application Programming interface) connectivity to connect a user's system of choice to each of the plurality of data sources by building applications on API technology such that the user can access the same type of data as if the user were logging in to a system managed and operated by the institution; running the applications within an ERP (Enterprise Resource Planning) solution system of the user's system of choice; and implementing the API connectivity to access data from the plurality of data sources in real time;
receiving user's login data associated with the user's account from the user's system of choice;
accessing data corresponding to the user's account in real time from the plurality of data sources via the API connectivity based on verification of the user's login data;
displaying the data in real time onto a graphical user interface (GUI) of the user's system of choice;
accessing the plurality of data sources to report bank account balance data and bank transaction history data associated with the user's account onto the GUI based on verification of the received user's login data;
comparing the bank account balance data and the bank transaction history data with the user's corresponding ERP balance data and ERP transaction history data, respectively; and
reconciling, based on comparing, any differences between the bank account balance data and the ERP balance data and between the bank transaction history data and the ERP transaction history data.

12. The non-transitory computer readable medium according to claim 11, wherein the instructions, when executed, further cause the processor to perform the following:
causing the GUI to display current global status information data of the user; and
filtering information to obtain a distinct set of data as desired by the user by utilizing graphs and scorecards.

13. The non-transitory computer readable medium according to claim 11, wherein the institution is a banking institution.

14. The non-transitory computer readable medium according to claim 11, wherein the data corresponds to data that includes one or more of the following data: balance data, transaction data, payment details data, access status data, and audit report data.

* * * * *